US006600322B1

(12) United States Patent
Nussbaum

(10) Patent No.: US 6,600,322 B1
(45) Date of Patent: Jul. 29, 2003

(54) STROKE DISTINCTION IN 4-CYCLE ENGINES WITHOUT A CAM REFERENCE

(75) Inventor: Stephen H. Nussbaum, San Diego, CA (US)

(73) Assignee: Murphy Power Ignition, San Diego, CA (US)

(*) Notice: Subject to any disclaimer, the term of this patent is extended or adjusted under 35 U.S.C. 154(b) by 20 days.

(21) Appl. No.: 09/986,230

(22) Filed: Oct. 22, 2001

Related U.S. Application Data

(63) Continuation-in-part of application No. 09/519,481, filed on Mar. 6, 2000, now Pat. No. 6,384,606.

(51) Int. Cl.[7] .......................... F02P 17/00; F02M 7/00; G01L 3/26

(52) U.S. Cl. ...................... 324/380; 324/399; 324/382; 324/388; 324/378; 123/435; 123/525; 123/478; 123/406.3; 73/116; 73/117.3

(58) Field of Search ................................ 324/388, 382, 324/399, 393, 378, 380; 123/406.4, 406.27, 435, 425; 73/117.3, 116

(56) References Cited

U.S. PATENT DOCUMENTS

| | | | | | |
|---|---|---|---|---|---|
| 3,784,901 | A | | 1/1974 | Miller et al. | 324/382 |
| 3,942,102 | A | | 3/1976 | Kuhn et al. | 324/399 |
| 4,090,125 | A | | 5/1978 | Warner | 324/399 |
| 4,870,587 | A | | 9/1989 | Kumagai | 701/110 |
| 5,054,461 | A | | 10/1991 | Deutsch et al. | 123/609 |
| 5,067,462 | A | * | 11/1991 | Iwata et al. | 123/406.2 |
| 5,068,613 | A | | 11/1991 | Kreft et al. | 324/379 |
| 5,087,882 | A | * | 2/1992 | Iwata | 324/388 |
| 5,105,783 | A | | 4/1992 | Nussbaum et al. | 123/335 |
| 5,156,127 | A | | 10/1992 | Ghaem | 123/406.1 |
| 5,180,984 | A | * | 1/1993 | Murata et al. | 324/399 |
| 5,189,373 | A | * | 2/1993 | Murata et al. | 324/399 |
| 5,208,540 | A | | 5/1993 | Hoeflich | 324/388 |
| 5,216,369 | A | | 6/1993 | Toyama | 324/388 |
| 5,411,006 | A | | 5/1995 | Noble et al. | 123/634 |
| 5,461,315 | A | | 10/1995 | Krause | 324/388 |
| 5,534,781 | A | * | 7/1996 | Lee et al. | 324/380 |
| 5,623,209 | A | | 4/1997 | Lepley et al. | 324/382 |
| 5,672,972 | A | | 9/1997 | McCoy et al. | 324/393 |
| 5,777,216 | A | * | 7/1998 | Van Duyne et al. | 73/116 |
| 5,896,842 | A | * | 4/1999 | Abusamra | 123/425 |
| 6,006,156 | A | | 12/1999 | Tozzi | 701/114 |
| 6,029,627 | A | * | 2/2000 | VanDyne | 123/435 |
| 6,133,741 | A | | 10/2000 | Mattes et al. | 324/502 |

* cited by examiner

*Primary Examiner*—N. Le
*Assistant Examiner*—Wasseem H. Hamdan
(74) *Attorney, Agent, or Firm*—Moser, Patterson & Sheridan, L.L.P.

(57) ABSTRACT

Methods, apparatus, and systems for distinguishing between compression and exhaust strokes of a four-cycle engine is provided. A first ionization time of a spark plug for a known cylinder is measured on a first engine stoke. A second ionization time of the spark plug is measured on a second engine stroke. The second ionization time is compared to the first ionization time. It is determined that the engine stroke with the greater ionization time is a compression stroke.

20 Claims, 8 Drawing Sheets

STROKE DISTINCTION IN 4-CYCLE ENGINES WITHOUT A CAM REFERENCE

CROSS-REFERENCE TO RELATED APPLICATION

This patent application is a continuation-in-part patent application of U.S. Ser. No. 09/519,481, now U.S. Pat. No. 6,384,606, filed Mar. 6, 2000.

The invention relates to the field of 4-cycle engines. More specifically, the invention relates to methods, apparatus, and systems for distinguishing between compression and exhaust cylinder strokes for 4-cycle engines.

BACKGROUND OF THE INVENTION

Modern ignition systems rely on accurate crankshaft position calculations to determine a corresponding piston position in a cylinder, which is necessary to determine an optimal time to fire a spark plug for the cylinder. It is well known in the art to calculate crankshaft position of 2-cycle engines by observing two pulse trains generated by sensors that detect, for example, flywheel teeth in a ring gear. The first pulse train has the same angular frequency as the engine, providing a single pulse per engine revolution at the Top Dead Center (TDC) position of a piston in a predetermined cylinder. The second pulse train provides a number of pulses per engine revolution equal to the number of flywheel teeth in the ring gear. Using these two pulse trains as references, the ignition system can calculate a crankshaft position, corresponding piston position, and determine proper ignition timing.

For 4-cycle engines, however, a spark plug for a cylinder is fired every other engine revolution, as the piston for the cylinder alternates between compression and exhaust strokes. Therefore, to determine proper ignition timing, it is also necessary to distinguish between compression and exhaust strokes. Traditionally, ignition systems for 4-cycle engines require a third pulse train to distinguish between compression and exhaust strokes. This third pulse train may be generated by a cam reference sensor that provides a pulse every other engine revolution, possibly at a Top Dead Center (TDC) position of a known cylinder on its compression stroke.

FIG. 1 illustrates a block diagram of an exemplary ignition system with an ignition controller 111 to distinguish between exhaust and compressions strokes according to a method that utilizes a camshaft reference sensor.

Flywheel sensor 100 detects magnet 101 on flywheel 102, generating pulse train 108, which has the same angular frequency as the engine, and provides a single pulse per revolution of the engine (1/REV) at the Top Dead Center point of a known piston. Ring gear sensor 103 senses the teeth on ring gear 104, generating pulse train 109, the Position Indicating Pulses (PIP), which has an angular frequency that is equal to the angular frequency of the first pulse train multiplied by the number of teeth in the gear wheel. Thus, the Position Indicating Pulse has an angular resolution equal to 360°/number teeth.

In order to distinguish between compression and exhaust strokes, the camshaft sensor 105 detects magnet 106 on camshaft 107, generating pulse train 110 that provides a pulse every other revolution (1/2REV) on Top Dead Center of the compression stroke of a known cylinder. Modifying the crankshaft to provide for camshaft sensor 105 and magnet 106 is expensive. Further, the additional wiring and interface circuitry for camshaft 105 adds cost and complexity to the ignition system.

DETAILED DESCRIPTION

The following detailed description sets forth an embodiment or embodiments in accordance with the present invention. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

One embodiment of the present invention provides a method to distinguish between compression and an exhaust strokes of a 4-cycle engine without the need for a camshaft reference sensor. Relative cylinder pressures in one or more known cylinders are observed for alternate engine strokes. Cylinder pressure should be greater during the compression stroke than the exhaust stroke, therefore the engine stroke corresponding to the greater cylinder pressure is determined to be the compression stroke. For one embodiment, information regarding cylinder pressure of a known cylinder is inferred by calculating ionization times for a spark plug of the cylinder on successive engine strokes.

One embodiment of the present invention provides a method and apparatus to measure a demand voltage, the voltage required to fire a spark plug, by measuring the variable ionization times and calculating the demand voltage with this information including other fixed, known parameters. By measuring demand voltage, diagnostic information regarding the ignition coils and spark plugs may be determined. For one embodiment, the following faults can be detected by calculating demand voltage: open circuits in the primary, short circuits in the primary, open circuits in the secondary, and short circuits in the secondary. For one embodiment, the amount of energy delivered to a spark plug is minimized, in an effort to extend spark plug life, by controlling the voltage of a tank capacitor.

For the purposes of the present application ionization time is defined as the time between applying a voltage to a spark plug, and ionization of particles in a cylinder, which results in an arc across the spark plug gap (firing of the spark plug).

Because the present invention compares ionization times for different engine strokes, absolute ionization time measurements are not required. Because it is only necessary to determine for which engine stroke an ionization time is greater, relative ionization time measurements suffice. It should also be noted that (relative) ionization times may be measured with a timer, internal or external to a processor, such that the units are in clock cycles. Clock cycle measurements may be readily converted to standard time units, i.e. microseconds, if desired.

An Exemplary Ignition System

Figure 1:
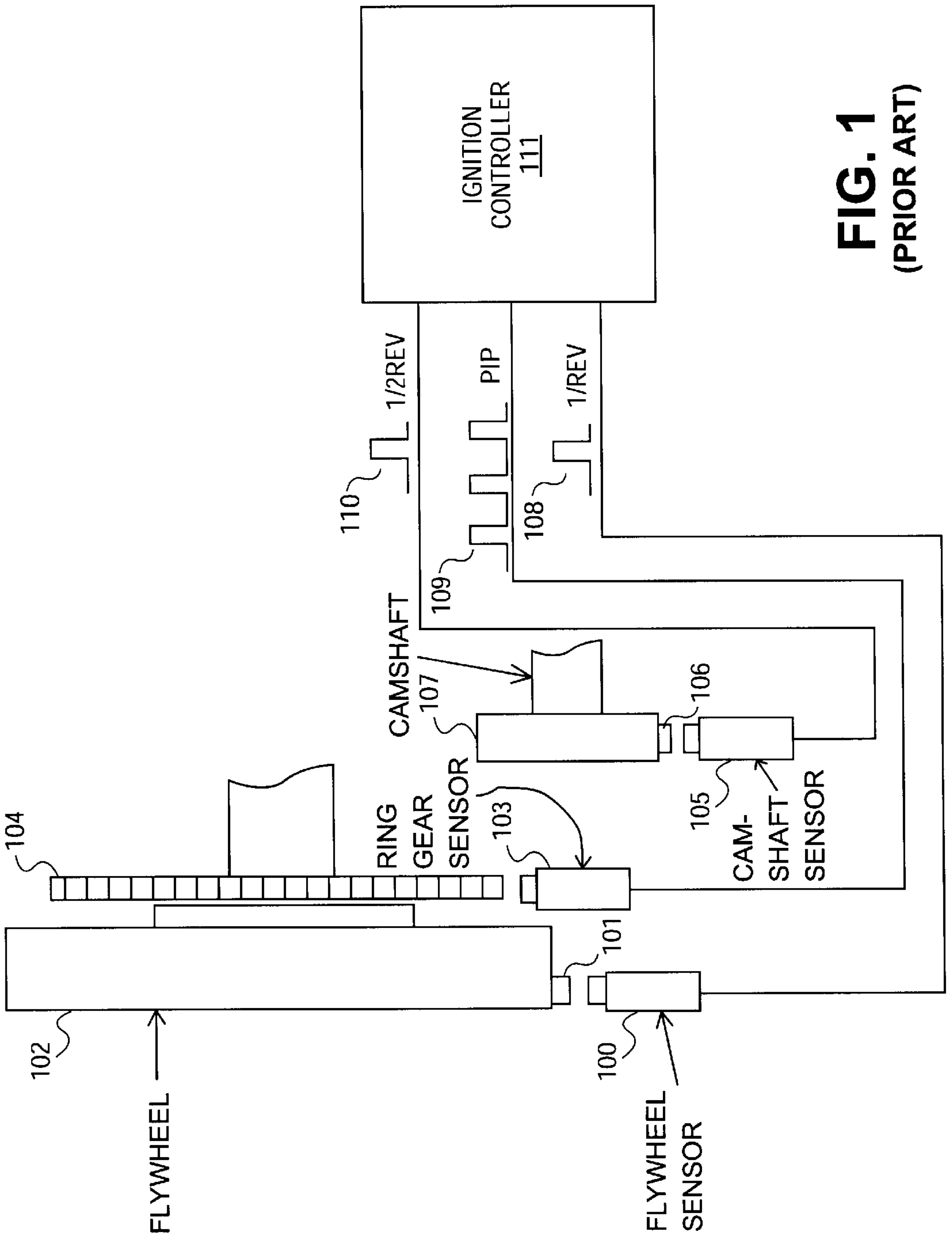
FIG. 1 (PRIOR ART)
FIG. 1 shows a block diagram of a prior art ignition system for a 4-cycle engine.
Figure 2:
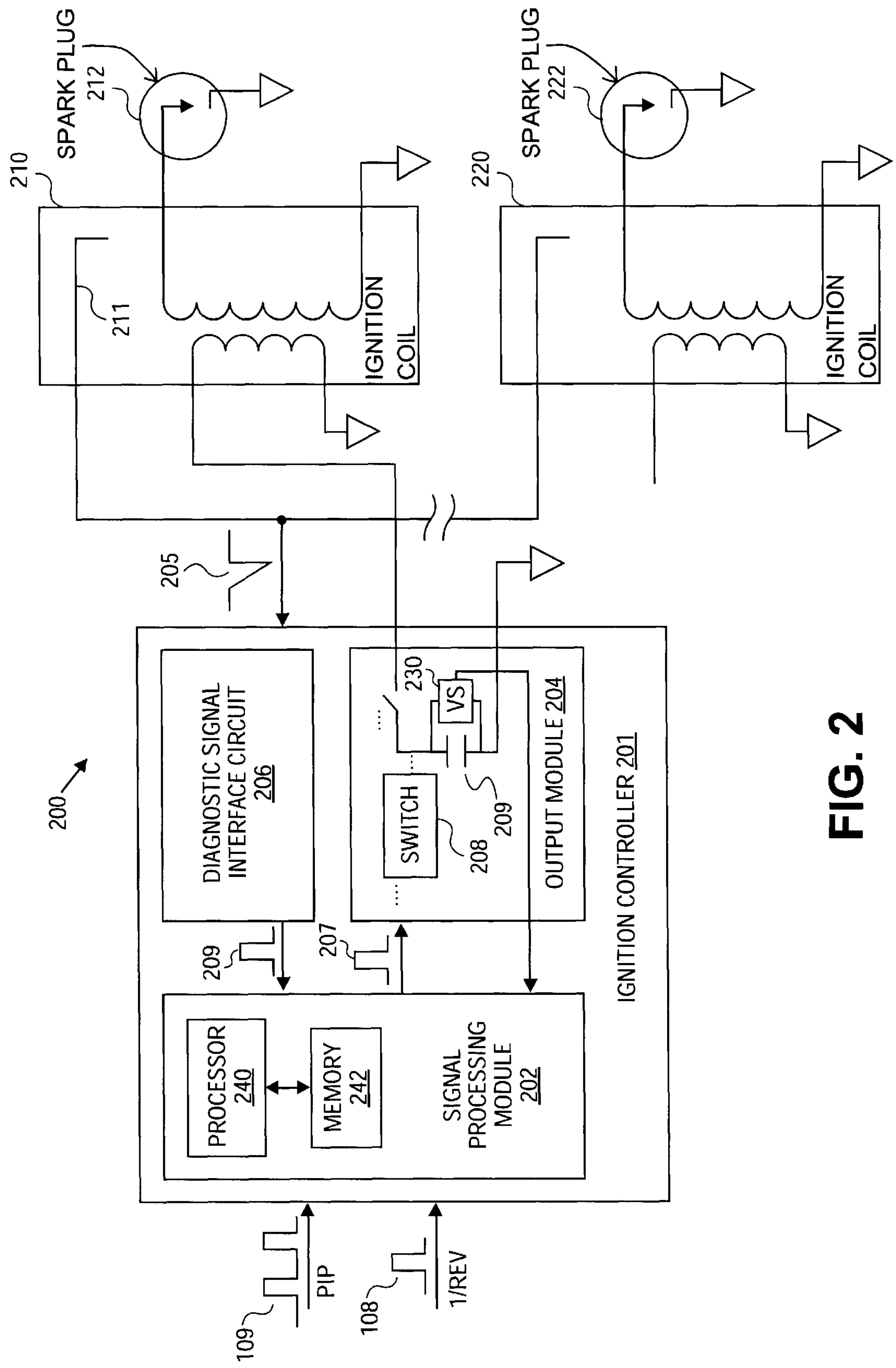
FIG. 2 shows a block diagram of an ignition system for a 4-cycle engine according to the present invention.

FIG. 2 shows an exemplary ignition system 200 for a 4-cycle engine, according to one embodiment of the present invention, to distinguish between compression and exhaust strokes of a 4-cycle engine that does not require a camshaft sensor. As illustrated, for one embodiment, ignition system 200 may comprise an ignition controller 201, one or more ignition coils, such as ignition coils 210 and 220, and one or more spark plugs, such as spark plugs 212 and 222.

For one embodiment, ignition system 200 utilizes an ignition coil 210 with an internal diagnostic lead 211 that provides a diagnostic signal 205 indicative of the timing of a voltage signal on the secondary winding of ignition coil 210. Such an ignition coil is disclosed in commonly owned U.S. Pat. No. 6,384,606, entitled "Ignition Coil with Lead for Secondary Diagnostics", which is hereby incorporated by reference.

As illustrated, ignition controller 201 may comprise a signal processing module (SPM) 202, an output module 204, diagnostic signal interface circuit (DSIC) 206, which may each comprise suitable circuitry. For one embodiment, SPM 202 comprises a processor 240 and a memory 242 to store suitable firmware instructions to perform stroke distinction according to the present invention. Processor 240 may be any suitable type of processor. For one embodiment, memory 242 may be integrated with processor 240.

SPM 202 may be coupled with output module 204 with a plurality of interface lines such that SPM 202 may generate an independent trigger signal for each ignition coil in ignition system 200. Output module 204 may comprise suitable circuitry to receive trigger signals from SPM 202, and discharge tank capacitor 209 through one or more ignition coils to fire one or more spark plugs. For one embodiment, output module 204 comprises a voltage sensor 230 to monitor the voltage of tank capacitor 209.

DSIC 206 may comprise suitable circuitry to receive diagnostic signal 205, generate a firing event signal 209, and output firing event signal 209 to SPM 202. For one embodiment, diagnostic leads of ignition coils are coupled together to form a common node which is coupled with DSIC 206. DSIC 206 may be coupled with SPM 202 by a single interface line that carries a firing event signal 210. However, because SPM 202 generates trigger signals for the ignition coils, SPM 202 may readily determine which ignition coil caused firing event signal 210.

To initiate an ignition event, SPM 202 may generate a trigger signal 207, which is received by output module 204, to fire spark plug 220 coupled with the secondary side of ignition coil 210. In response to trigger signal 207, switch 208 closes and tank capacitor 209 discharges into the primary side of ignition coil 210. The transformer action of ignition coil 210 causes a voltage build up on the secondary side of ignition coil 210. Once the voltage reaches an ionization level of the spark plug gap, an arc is created and the secondary voltage rapidly decays towards zero. This rapid decay defines a firing point of the spark plug. This build up and rapid decay results in the creation of diagnostic signal 205 on diagnostic lead 211.

Figure 3:
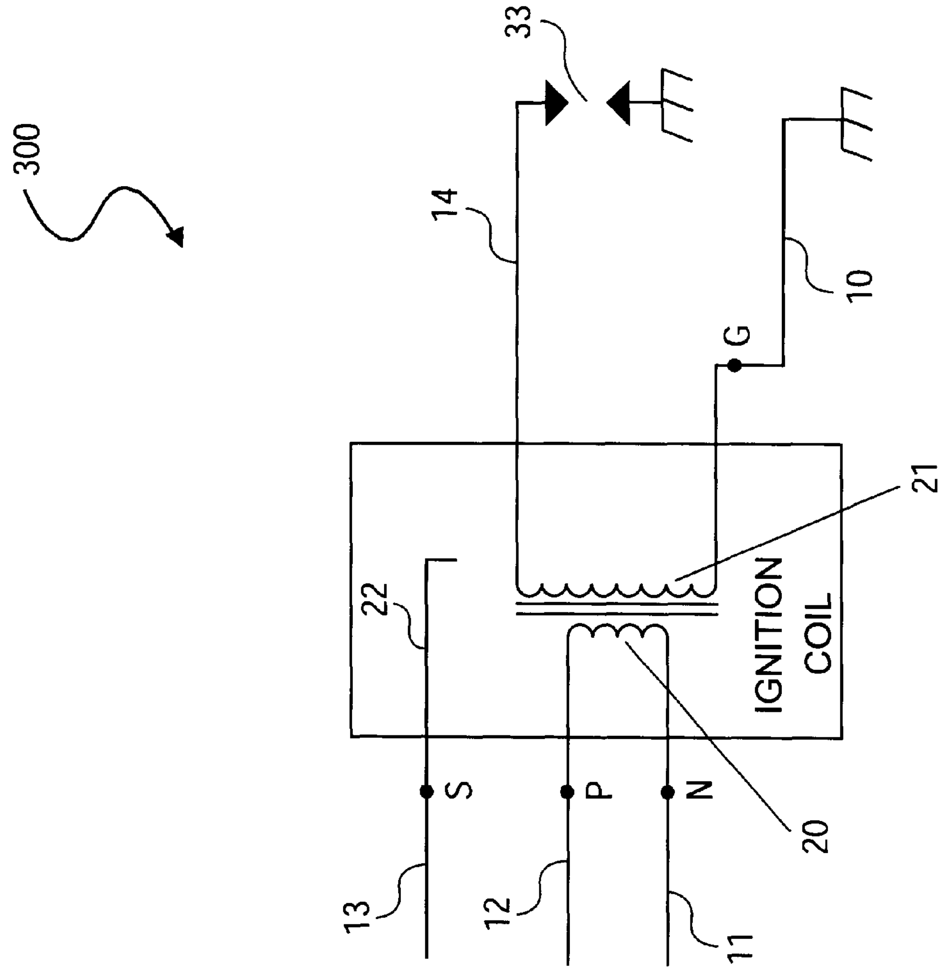
FIG. 3 shows a schematic diagram of the ignition coil according to the preferred embodiment.

FIG. 3 shows a schematic view of an ignition coil 300 according to one embodiment. Positive Lead 12, and Negative Lead 11, are connected across the Primary Side 20 of the coil, while Plug Lead 14 and Ground Lead 10 are connected across the Secondary Side 21 of the coil. Diagnostic Lead 13 is connected to Sense Wire 22.

Sense Wire 22 acts as an antenna, of sorts, sensing the electric field radiated from the Secondary Side 21. Therefore, Sense Wire 22 must be placed in close proximity to the Secondary Side 21 of the coil so that it can sense the electric field created by the high voltage across Secondary Side 21. It is critical, however, that the distance between the Sense Wire 22 and the Secondary Side 21 and the dielectric strength of the coil fill material precludes arcing between the Secondary Side 21 and the Sense Wire 22.

According to the preferred embodiment, the Sense Wire 22 is advantageously placed at an angle such that the effect of the electric field created by the voltage across the Primary Side 20 is minimized. Since only one spark plug fires at any given time, Diagnostic Leads 13 for a plurality of ignition coils may be coupled together to form a common node without affecting the overall impedance. Therefore, only one Diagnostic Signal Interface Circuit (DSIC) 206 is necessary, reducing overall system cost.

Figure 4:
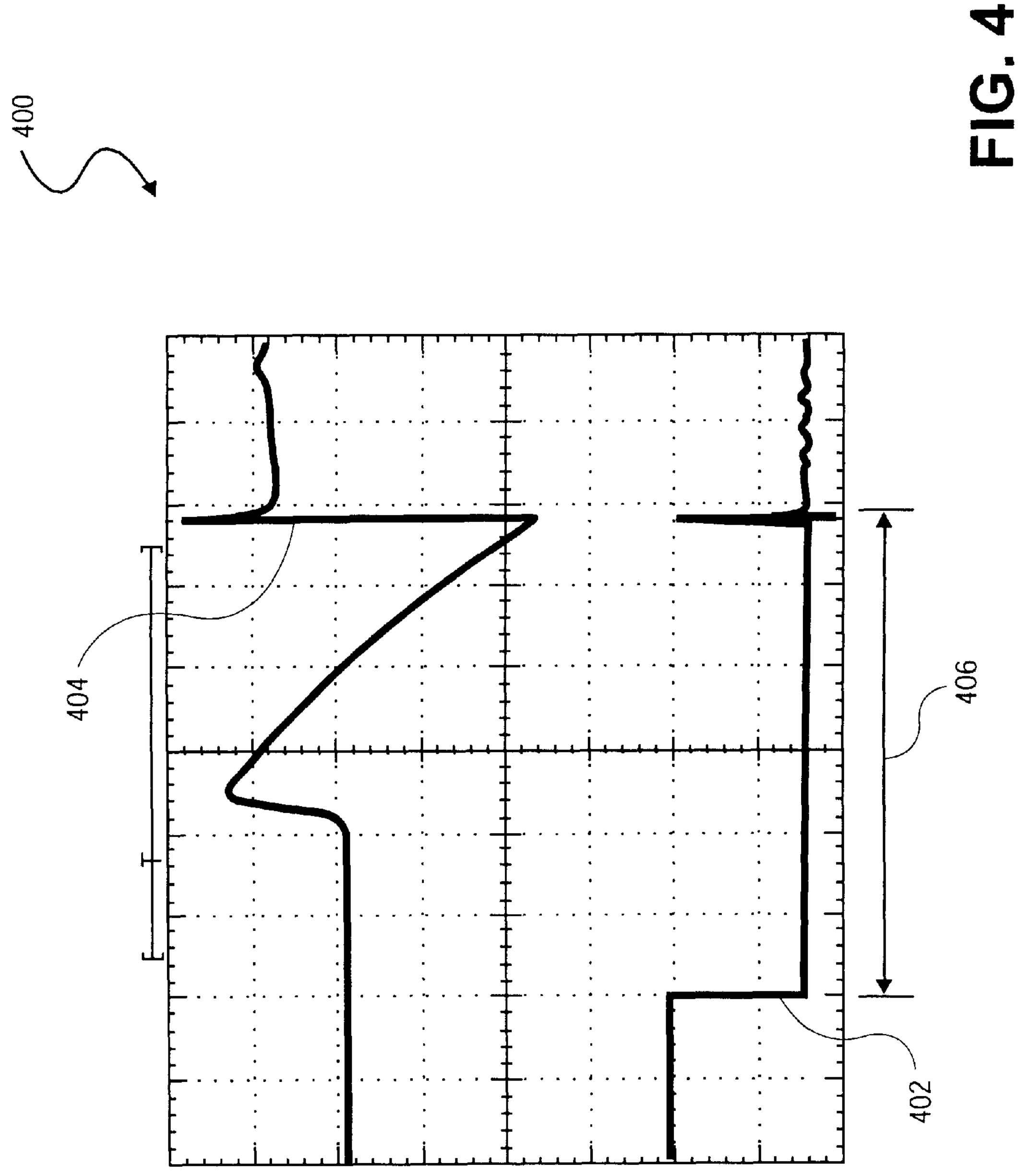
FIG. 4 shows a timing diagram of an exemplary diagnostic signal that may be produced on a diagnostic lead of an ignition coil used in a preferred embodiment of the present invention.

FIG. 4 illustrates a timing diagram 400, of an exemplary diagnostic signal that may be induced on a diagnostic lead of one of the ignition coils, along with a firing event signal generated by SDIC 206. Reference number 402 indicates a primary timing pulse caused by a trigger signal generated by SPM 202 indicating a voltage has been applied to a primary side of the ignition coil, reference number 404 indicates a firing point of the spark plug, and reference number 406 indicates an ionization time. To measure an ionization time, for one embodiment, SPM 202 initiates a timer with primary timing pulse 402, and terminates the timer when a firing event signal is generated by DSIC 206.

Ionization Time Measurement

Figure 5:
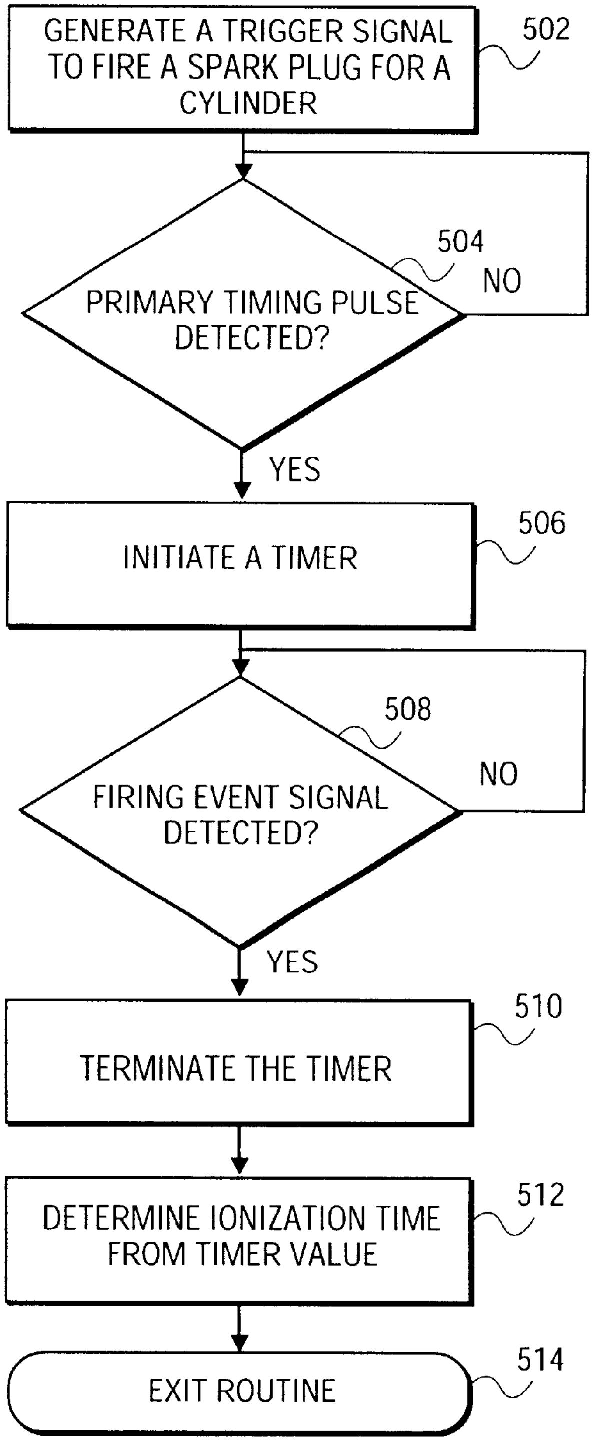
FIG. 5 shows a flow diagram of a method to measure ionization time according to one embodiment of the present invention.

FIG. 5 shows a flow diagram of a method to measure ionization time according to one embodiment of the present invention. For step 502, a trigger signal is generated to fire a spark plug of a cylinder. For step 504, the system waits for a primary timing pulse to indicate a voltage has been applied to the primary side of an ignition coil coupled with the spark plug. If the primary timing pulse is detected, a timer is initiated for step 506. For step 508, the system waits for a firing event signal to indicate the ionization level of the spark plug has been reached, and the spark plug has fired. If a firing event signal is detected, the timer is terminated for step 510. For one embodiment, the primary timing pulse and firing event signals may generate timer interrupts. For step 512, the system determines the ionization time from the timer value. For step 514, the routine is exited.

Ionization time 306 can then be used in conjunction with the tank capacitor voltage prior to firing, and ignition coil constants, particular to the coils used, to determine an ionization level, often referred to as a breakdown or demand voltage. Demand voltage is indicative of several useful diagnostic factors, such as the condition of a spark plug and the energy required to fire the spark plug. For one embodiment, ignition controller 201 calculates a breakdown voltage, and controls a tank capacitor voltage to limit the energy supplied to the spark plug, in an effort to avoid supplying excess energy which shortens plug life.

Referring back to FIG. 2, SPM 202 may receive 1/REV pulse train 108 and position indicating pulse (PIP) 109 as reference signals to calculate crankshaft positions necessary to perform ignition timing. For 4-cycle engines, because a spark plug is fired every other engine revolution, it is also necessary to distinguish between compression and exhaust strokes. As previously described, traditional ignition systems for 4-cycle engines rely on a camshaft reference sensor for this distinction. However, ignition system 200 is capable of distinguishing between compression and exhaust strokes without a camshaft reference sensor by measuring ionization times for a spark plug of one or more known cylinders for successive engine strokes.

Stroke Distinction Based on Ionization Time

Ionization time (IT) is primarily a function of the following parameters: spark plug gap distance (GD), cylinder pressure (CP), and primary voltage (PV). The general qualitative relationship between Ionization Time and the above parameters is:

$$IT=(K1*GD*K2*CP)/K3*PV$$

Where K1, K2 and K3 are constants particular to specific components used. This relationship shows that IT is proportional to gap distance and cylinder pressure and inversely proportional to primary voltage. Taking the ratio of IT during compression (ITcomp) and IT during exhaust (ITexh) yields:

$$ITcomp/ITexh=\frac{K1*GD*K2*CPcomp/K3*PV}{K1*GD*K2*CPexh/K3*PV}$$

or, by canceling terms: ITcomp/ITexh=CPcomp/CPexh

Comparing IT at the same angle in successive engine strokes for a cylinder leads to the distinction of the two strokes. As an example, for typical values (GD=0.012"–0.020", CPcomp>50 psig, CPexh 0–1 psig on exhaust, and PV=200–250 V), ITcomp will range from 30–50 usec, while the ITexh will range from 5–20 usec. Therefore, for one embodiment, distinguishing between exhaust and compression strokes comprises measuring the ionization time of a known cylinder for successive strokes to determine which stroke corresponds to a greater ionization time, which is determined to be the compression stroke.

Figure 6:
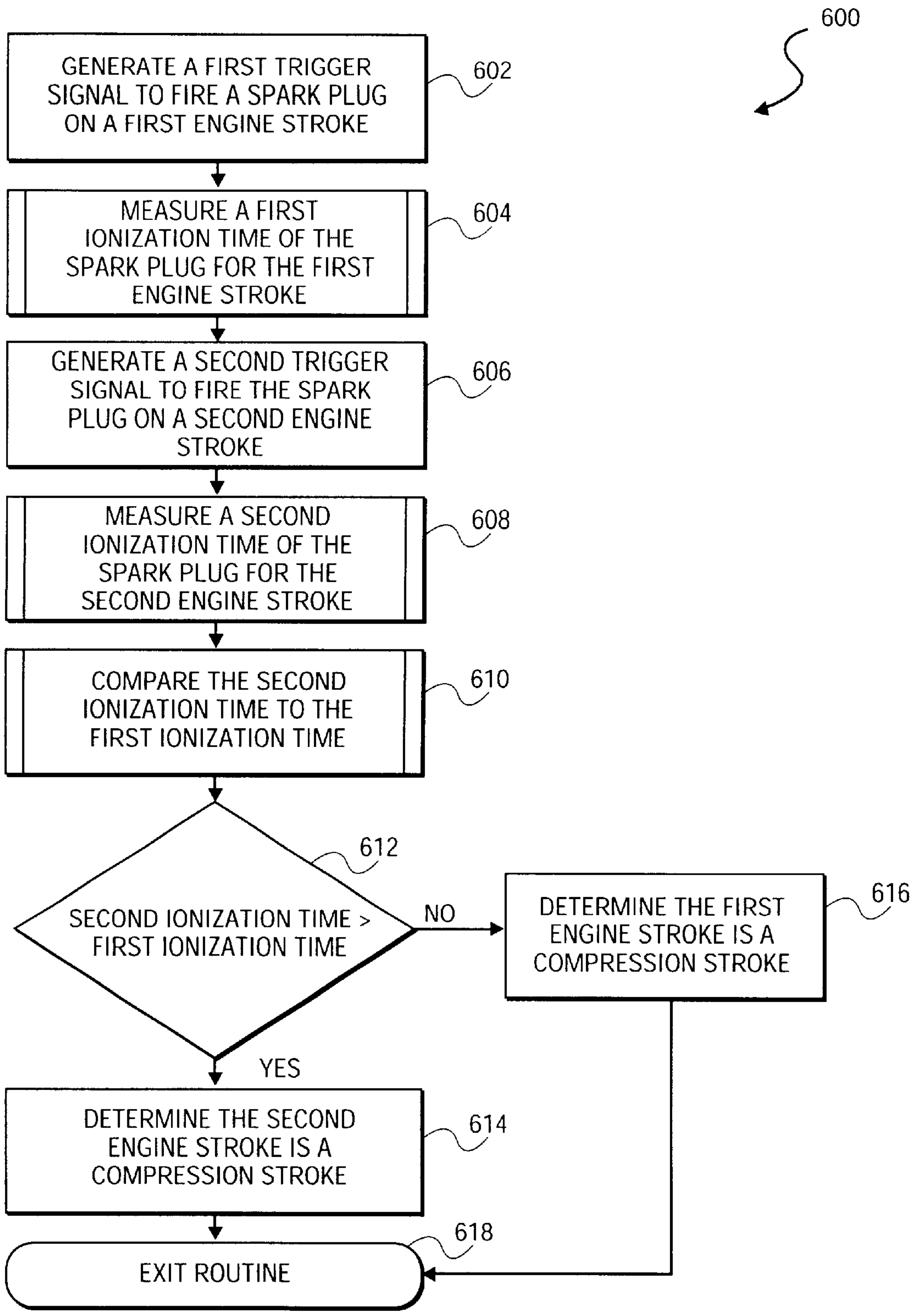
FIG. 6 shows a flow diagram of a stroke distinction routine to distinguish between a compression and an exhaust stroke according to one embodiment of the present invention.

FIG. 6 illustrates a flow diagram 600, of a stroke distinction routine for a 4-cycle engine. The routine illustrated by flow diagram 600 may be executed by a processor of SPM 202. For step 602, SPM 202 generates a first trigger signal to fire a spark plug on a first engine stroke. For step 604, SPM 202 measures a first ionization time of the spark plug for the first engine stroke.

For one embodiment, to measure an ionization time, SPM 202 records the time at which a trigger signal to fire a spark plug is generated, monitors DSIC 206 for a firing event pulse to indicate the spark plug has fired, records the time the firing event is detected, and calculates the difference. For another embodiment, a trigger signal initiates a timer, while a firing event signal terminates the timer, so that SPM 202 reads the ionization time from the timer. Any suitable method may be used to measure ionization times.

For step 606, SPM 202 generates a second trigger signal to fire the spark plug on a second engine stroke. For step 608, SPM 202 measures a second ionization time of the spark plug for the second engine stroke. For step 610, SPM 202 compares the second ionization time to the first ionization time. For step 612, if the second ionization time is greater than the first ionization time, SPM 202 determines the second engine stroke is a compression stroke, for step 614. If the first ionization time is greater than the second ionization time, SPM 202 determines the first engine stroke is a compression stroke, for step 616. For step 618, the stroke distinction routine is exited.

While the second engine stroke may be any stroke that occurs an odd number of engine strokes later (i.e., 2*N+1 strokes later, wherein N is an integer greater than or equal to 0), ideally, it occurs on the next successive engine stroke after the first engine stroke. For example, if the first engine stroke is an exhaust stroke, the second engine stroke should be the next compression stroke to minimize the number of engine revolutions required to reliably distinguish between exhaust and compression strokes. For one embodiment, the second ionization time could be measured for a different cylinder than the first ionization time.

For one embodiment, the first and second ionization times must differ by a minimum threshold amount for SPM 202 to make a determination. If the first and second ionization times fail to differ by the threshold amount, the calculations may be discarded, and the routine may be repeated. Alternatively, SPM 202 may generate an error message, for example, on a local user interface (not shown).

For one embodiment, the stroke distinction routine may be performed a second time for the same cylinder in an effort to determine a compression stroke with a greater degree of certainty. For example, a third ionization time may be measured and compared against the second ionization time for the same cylinder. If the comparisons yield inconsistent results, an error message may be generated.

For one embodiment, the stroke distinction routine is performed for more than one cylinder. For example, the stroke distinction routine may be performed on half the cylinders during successive engine revolutions. For another embodiment, the stroke distinction routine is performed on half the cylinders during four successive engine revolutions. Ionization times for each cylinder, during each revolution, may be compared to determine which engine revolution corresponded to a compression stroke for each cylinder. For each comparison that yields consistent results, a "score" counter may be incremented. Ignition controller 201 may determine that if the score exceeds a predetermined threshold level, a distinction may be made.

Preferably, the stroke distinction routine is performed only during the cranking phase, meaning that the ignition system will fire on both the compression and exhaust strokes. This is to ensure smooth engine operation with no noticeable delay upon startup. In the preferred embodiment, a reliable stroke distinction occurs after no more than four engine revolutions. Once the compression stroke is determined, firing on the exhaust stroke ceases, and the ignition system relies on 1/REV pulse train 108 and PIP pulse train 110 to keep track of compression and exhaust cycles.

In the preferred embodiment, ignition system 200 receives diagnostic signal 205 from a diagnostic lead of an ignition coil. According to another embodiment, the source of the signal representing the firing event may be provided by another means, such as a current sensing device.

For one embodiment, an ignition system may comprise two or more ignition coils per cylinder. The ignition coils may be fired on alternate compression strokes. The ignition coils may be configured as sets of coils, with a set comprising one coil per cylinder. For one embodiment a separate tank capacitor is provided for each set of ignition coils. For one embodiment, the diagnostic leads of each ignition coil in a set are coupled together to form a common node. Therefore, ignition controller 201 may comprise suitable circuitry to receive diagnostic signals from more than one common node of more than one set of ignition coils. In one embodiment, diagnostic signals are multiplexed so that ignition controller 201 may receive multiple diagnostic signals with one diagnostic signal interface circuit (DSIC). For another embodiment, ignition controller 201 may comprise a plurality of DSICs.

In another embodiment, stroke distinction may be performed by measuring cylinder pressures directly, for example, with pressure transducers. Cylinder pressures for successive strokes may then be compared, and the engine stroke corresponding to the greatest cylinder pressure may be determined to be a compression stroke. While a pressure transducer may only be required for one cylinder to perform the stroke distinction routine, the transducer and associated circuitry required offsets some of the cost savings realized by eliminating the camshaft reference sensor.

Stroke Distinction and Ignition Timing

For a 4-cycle engine, an ignition system should distinguish between compression and exhaust strokes to avoid firing a spark plug for a cylinder on an exhaust stroke. For one embodiment, the results of the stroke distinction routine may be stored in memory for use by an ignition timing routine. As an example, the results of the stroke distinction routine may be stored as a stroke indicating flag, i.e. a bit in a register. Because a 4-cycle engine alternates between exhaust and compression strokes, the stroke indicating flag may be toggled from one value to another every engine revolution. For one embodiment, the stroke indicating flag is toggled when a 1/REV pulse is detected, indicating a complete revolution of the engine.

Figure 7:
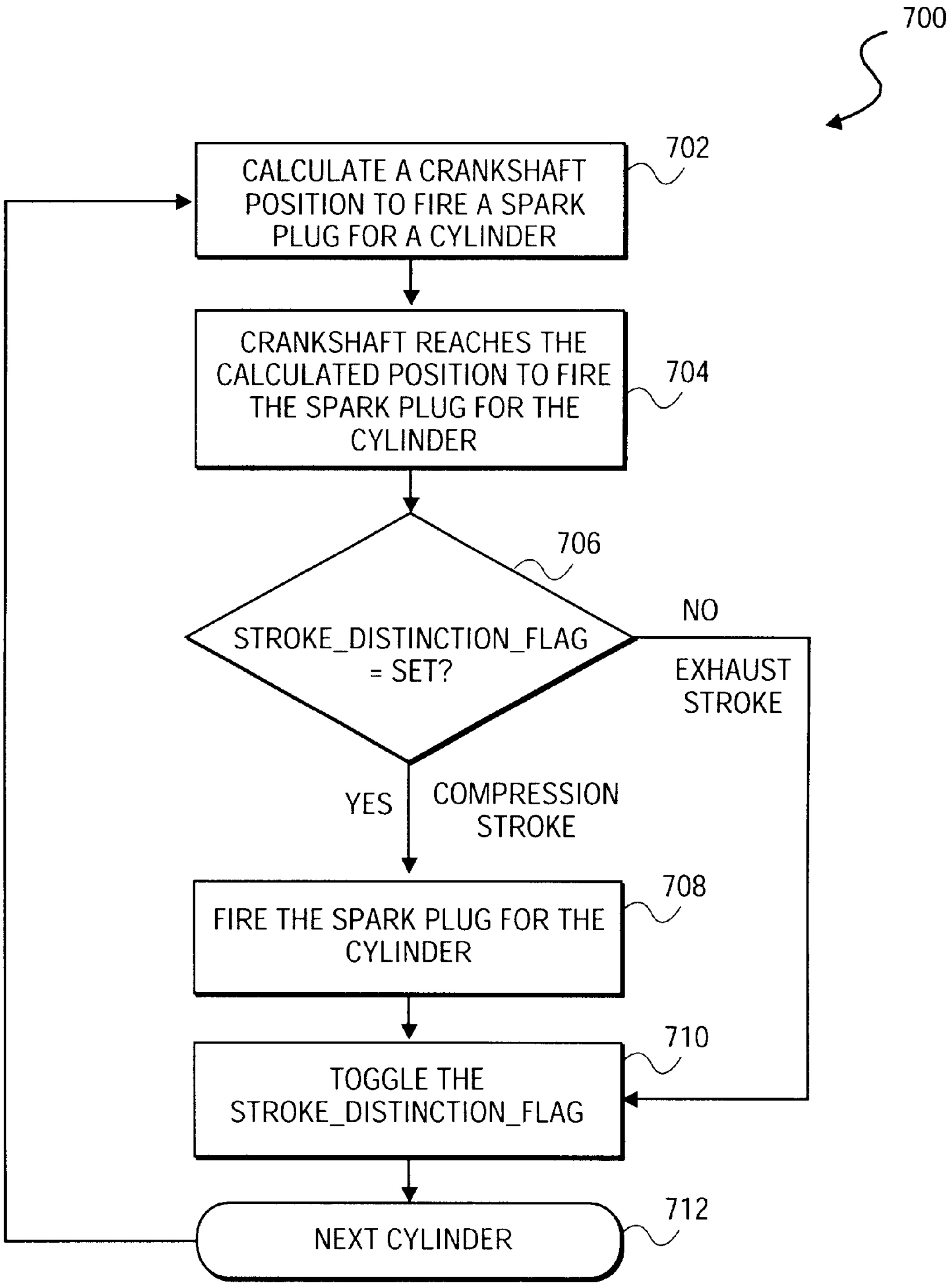
FIG. 7 shows a flow diagram of an exemplary ignition timing routine that utilizes the results of a stroke distinction routine.

FIG. 7 shows a flow diagram of an exemplary ignition timing routine that utilizes the results of a stroke distinction routine. For step 702, a crankshaft position to fire a spark plug of a cylinder is calculated. The position may be calculated to fire the spark plug before or after a top dead center (TDC) of the cylinder, resulting in advanced or retarded timing, respectively.

For step 704, the crankshaft reaches the calculated position to fire the spark plug for the cylinder. For step 706, the system checks a stroke distinction flag to determine if the piston for the cylinder is on a compression or an exhaust stroke. If the stroke distinction flag is set, the piston is on a compression stroke, and the spark plug for the cylinder is fired for step 708. If the stroke distinction flag is not set, the spark plug is not fired. For step 710, the stroke distinction flag is toggled. For example, if the stroke distinction flag was set to indicate the current stroke is a compression stroke, it will be cleared to indicate the next stroke is an exhaust stroke. For one embodiment, a stroke distinction flag may be provided for each cylinder of the engine.

Demand Voltage Calculations

For one embodiment, ionization times may be used to calculate a demand voltage for each spark plug, the voltage required to fire a spark plug. By calculating demand voltage, the ignition controller can detect faults, predict spark plug life, and control the energy supplied to a spark plug in an effort to extend spark plug life. Demand voltage may be calculated from ionization time using the following equation:

$$V\text{demand}=-V\max\, e^{-T/\alpha}\,\text{Sin}(\omega T)$$

Wherein Vmax, $\alpha$ and $\omega$ are well known constants. Vmax is a function of the primary voltage and the ignition coil turns ratio, $\alpha$ is a function of circuit resistance, and $\omega$ is a function of the tank capacitance and coil inductance.

Calculating the demand voltage allows ignition controller 201 to minimize the energy delivered to a spark plug, which may help extend spark plug life. For one embodiment, ignition controller 201 has an analog output means to control the voltage of tank capacitor 209. Ignition controller 201 may set the voltage of tank capacitor 209 to a predetermined voltage level above the demand voltage to ensure the spark plug fires.

Calculating the demand voltage may also provide information regarding the condition, or "age," of the spark plug. For example, an increased demand voltage may indicate a fouled spark plug, with a residual build-up on the spark plug. For one embodiment, ignition controller 102 may indicate a relative age, for example, on a user interface (not shown), which may prompt a user to replace old plugs before they adversely affect engine performance. For one embodiment, demand voltage readings of spark plugs for one or more cylinders may be displayed on the user interface.

For one embodiment, ignition controller 201 calculates demand voltage with a lookup table, or "map", that is generated based on ionization times and constant values for a particular system. For example, ignition controller 201 may measure an ionization time and look up a corresponding demand voltage, in kilo-volts (kV) from the map. For one embodiment, ignition controller 201 calculates demand voltage using mathematical equations, and entered constants values. Ionization times that appear outside the map may indicate fault conditions, as illustrated in Table 1, while normal operation may be indicated by a ionization time of 20–90 us, which may correspond to a kV reading of approximately 5–30 kV.

TABLE 1

| Condition | Indications |
|---|---|
| Normal Operation | Firing Event Timing Pulse Received 20–90 us |
| Open Primary | No Primary Timing Pulse Received to Start Timing |
| Open Secondary | Firing Event Timing Pulse is outside map |
| Shorted Primary | Timing Edge is inside Map, Low Tank Cap Voltage |
| Shorted Secondary | Firing Event Timing Pulse of 150–190 us |

An open primary may be indicated by the absence of a primary timing pulse received from DSIC 206. An open secondary may be indicated by a firing event pulse that is received too late, outside the kV map. A shorted primary may be indicated by a timing pulse that is inside the kV map, but with a low tank capacitor voltage reading, for example, from voltage sensor 230. A shorted secondary may be indicated by a firing event timing pulse that is inside the map, but outside a normal operating range. For one embodiment, ignition controller 201 indicates fault conditions on a user interface (not shown). For one embodiment, ignition controller 201 may shutdown the ignition system and sound a local or remote alarm.

Figure 8:
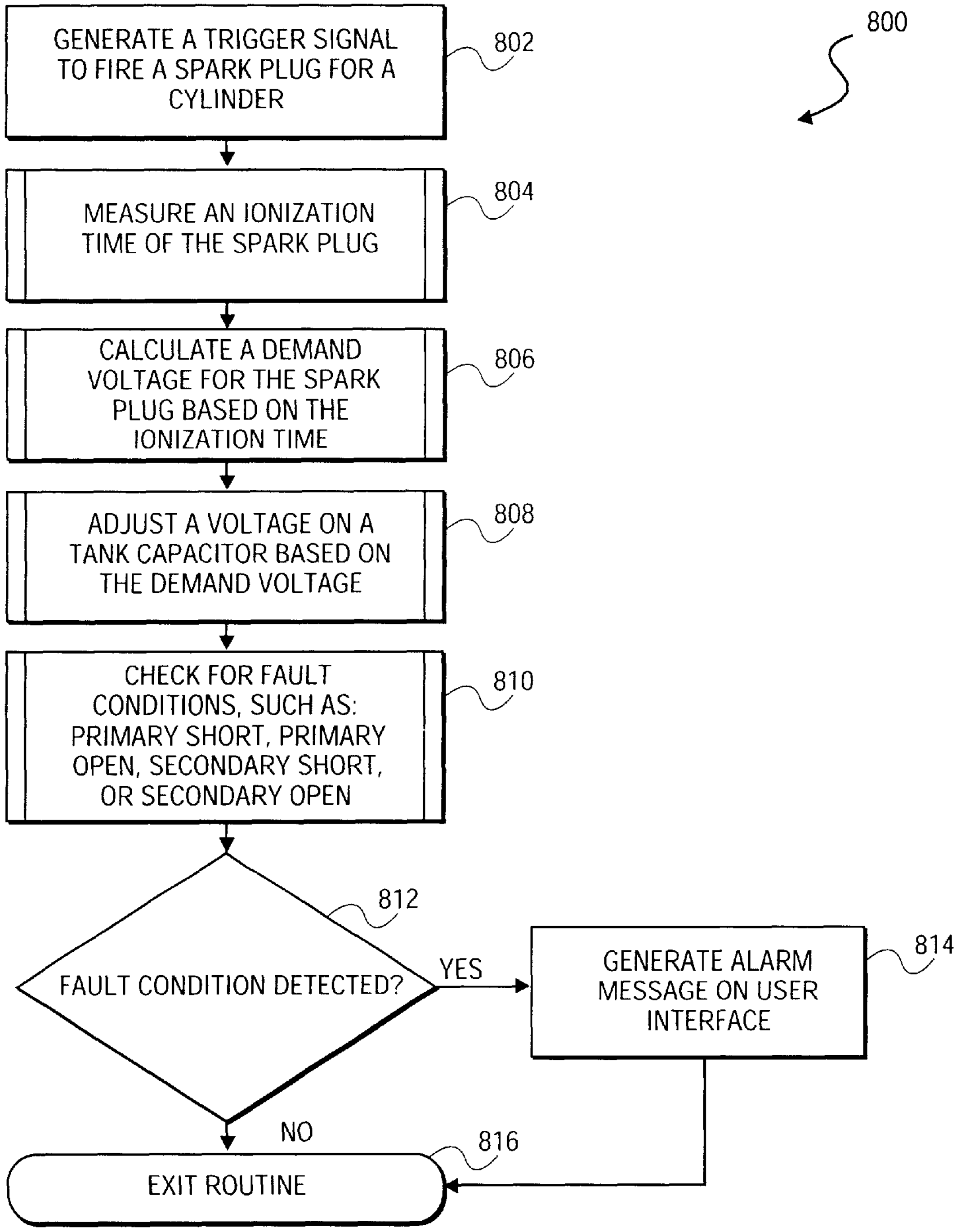
FIG. 8 shows a flow diagram of a method to calculate demand voltage and utilize demand voltage to control energy to a spark plug and detect fault conditions.

FIG. 8 shows a flow diagram of a method to calculate and utilize demand voltage to adjust energy delivered to a spark plug and detect engine faults. For step 802, a trigger signal is generated to fire a spark plug for a cylinder. For step 804, an ionization time is measured for the spark plug. For step 806, a demand voltage of the spark plug is calculated based on the ionization time. For step 808, a voltage on a tank capacitor is adjusted to control the amount of energy delivered to spark plugs. For step 810, various fault conditions are checked for. For step 812, if no fault conditions are detected, the routine is exited, for step 816. If fault conditions are detected, an alarm message is generated on a user interface for step 814, prior to exiting the routine, for step 816.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An ignition controller for use with a 4-cycle engine comprising:

an output circuit to couple with one or more ignition coils to fire a spark plug coupled with each of the one or more ignition coils;

a diagnostic signal interface circuit to receive a diagnostic signal generated when one of the spark plug fires; and a signal processing circuit coupled with the output circuit and diagnostic signal interface circuit, the signal processing circuit configured to measure a first ionization time of a spark plug coupled with one of the ignition coils for a first engine stroke, measure a second ionization time of the spark plug for a second engine stroke, compare the second ionization time to the first ionization time, and determine the engine stroke corresponding to the greater of the first and second ionization times is a compression stroke.

2. The ignition controller of claim 1, wherein the first and second engine strokes are successive engine strokes.

3. The ignition controller of claim 1, wherein the signal processing circuit is further configured to measure a third ionization time of the spark plug for a third engine stroke, measure a fourth ionization time of the spark plug for a fourth engine stroke, compare the third ionization time to the fourth ionization time, and determine the engine stroke corresponding to the greater of the third and fourth ionization times is a compression stroke.

4. The ignition controller of claim 1, wherein the signal processing circuit is further configured to output a first trigger signal to the output circuit to fire the spark plug on the first engine stroke and output a second trigger signal to the output circuit to fire the spark plug on the second engine stroke.

5. The ignition controller of claim 1, wherein the signal processing circuit is further configured to record the time of a trigger signal generated to fire the spark plug and to record the time of a firing event signal indicative of the spark plug firing.

6. The ignition controller of claim 1, wherein the signal processing circuit is further configured to measure a third ionization time of the spark plug on a third engine stroke, measure a fourth ionization time of the spark plug on a fourth engine stroke, and compare the fourth ionization time to the third ionization time, wherein the third and fourth engine strokes are successive engine strokes.

7. The ignition controller of claim 1, wherein the signal processing circuit is further configured to:

measure a first ionization time for each spark plug coupled with a plurality of ignition coils on engine strokes during a first engine revolution;

measure a second ionization time for each spark plug coupled with the plurality of ignition coils on engine strokes during a second engine revolution; and compare the second ionization time to the first ionization time, for each spark plug of the plurality of cylinders.

8. An ignition system for use with a 4-cycle engine comprising:

a plurality of ignition coils, each coupled with a spark plug; and an ignition controller comprising:

an output circuit to couple with the plurality of ignition coils to fire the spark plug coupled with each of the plurality of ignition coils;

a diagnostic signal interface circuit to receive a diagnostic signal generated when one of the spark plugs fires; and a signal processing circuit coupled with the output circuit and diagnostic signal, the signal processing circuit configured to measure a first ionization time of a spark plug coupled with one of the ignition coils for a first engine stroke, measure a second ionization time of the spark plug for a second engine stroke, compare the second ionization time to the first ionization time, and determine the engine stroke corresponding to the greater of the first and second ionization times is a compression stroke.

9. The ignition system of claim 8, wherein the second engine stroke occurs 2*N+1 engine strokes after the first engine stroke, wherein N is an integer greater than or equal to zero.

10. The ignition system of claim 8, wherein each ignition coil comprises:

a primary winding onto which a primary voltage is applied;

a secondary winding onto which a secondary voltage is induced by said primary voltage, said secondary voltage creating an electric field; and a diagnostic lead placed in proximity to the secondary winding without being directly connected to the secondary winding, so that the electric field created by the secondary voltage induces the diagnostic signal onto the diagnostic lead.

11. The ignition system of claim 10, wherein the diagnostic lead of each ignition coil is coupled together to form a common node.

12. The ignition system of claim 8, wherein the signal processing circuit is further configured to:

measure a first ionization time for each spark plug coupled with a plurality of the ignition coils on engine strokes during a first engine revolution;

measure a second ionization time for each spark plug coupled with the plurality of ignition coils on engine strokes during a second engine revolution;

compare the second ionization time to the first ionization time, for each spark plug of the plurality of cylinders.

13. A method of distinguishing between compression and exhaust strokes of a 4-cycle engine comprising the steps of:

measuring a first ionization time of a spark plug for a known cylinder on a first engine stroke;

measuring a second ionization time of the spark plug on a second engine stroke;

comparing the second ionization time to the first ionization time; and determining the engine stroke corresponding to the greater of the first and second ionization times is a compression stroke;

wherein the steps are performed by a signal processing circuit of an ignition system.

14. The method of claim 13, further comprising the step of determining the engine stroke corresponding to the greater of the first and second ionization times is a compression stroke.

15. The method of claim 13, wherein the step of measuring an ionization time comprises:

recording the time of a trigger signal generated to fire the spark plug; and recording the time of a firing event signal indicative of the spark plug firing.

16. The method of claim 13, further comprising the steps of:

generating a first trigger signal to fire the spark plug on the first engine stroke; and generating a second trigger signal to fire the spark plug on the second engine stroke.

17. The method of claim 13, wherein the second engine stroke is the next successive engine stroke following the first engine stroke.

18. The method of claim 13, further comprising the steps of:

measuring a third ionization time of the spark plug on a third engine stroke;

measuring a fourth ionization time of the spark plug on a fourth engine stroke;

comparing the fourth ionization time to the third ionization time.

19. A method of distinguishing between compression and exhaust strokes of a 4-cycle engine having more than one cylinder, each cylinder having at least one spark plug, comprising the steps of:

measuring a first ionization time for each spark plug of a plurality of cylinders on engine strokes during a first engine revolution;

measuring a second ionization time for each spark plug of the plurality of cylinders on engine strokes during a second engine revolution; and comparing the second ionization time to the first ionization time, for each spark plug of the plurality of cylinders; and determining the engine stroke corresponding to the greater of the first and second ionization times is a compression stroke;

wherein the steps are performed by a signal processing circuit of an ignition controller.

20. The method of claim 19, further comprising the steps of:

incrementing a counter every time a comparison of second and first ionization times yields consistent results; and determining either the first or second engine revolution corresponds to a compression stroke for one of the plurality of cylinders if the counter exceeds a predetermined value.

* * * * *